(No Model.)
E. F. BARNES.
COMBINED PIPE TONGS AND WRENCH.
No. 282,256.　　　　　　　　　Patented July 31, 1883.
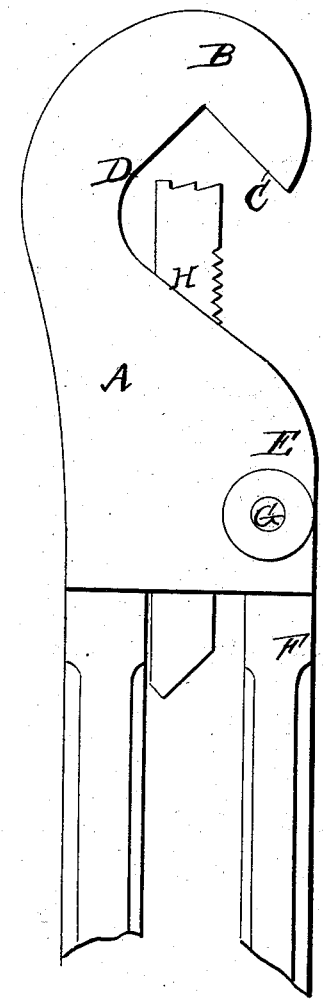
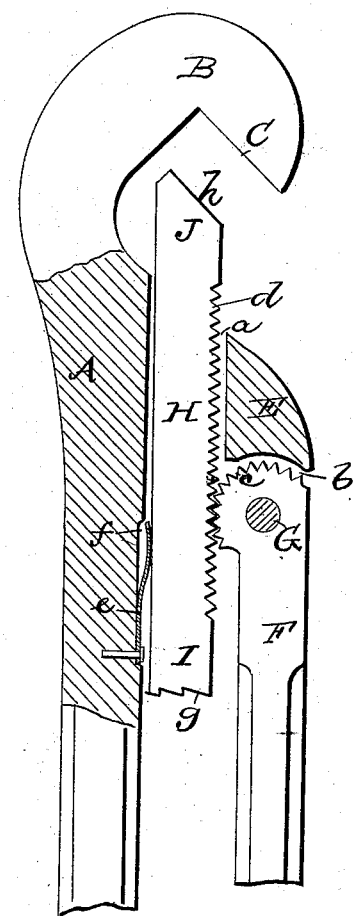
Witnesses:
S. Hough
Root Brown
Inventor:
Elbridge F. Barnes
By Andrew O'Neill
and Chas. J. Gooch
Attorneys
N. PETERS, Photo-Lithographer, Washington, D. C.

UNITED STATES PATENT OFFICE.

ELBRIDGE F. BARNES, OF NEW HAVEN, CONNECTICUT.

COMBINED PIPE-TONGS AND WRENCH.

SPECIFICATION forming part of Letters Patent No. 282,256, dated July 31, 1883.

Application filed January 29, 1883. (No model.)

*To all whom it may concern:*

Be it known that I, ELBRIDGE F. BARNES, a citizen of the United States, residing at New Haven, in the county of New Haven and State of Connecticut, have invented certain new and useful Improvements in Pipe-Tongs and Wrench Combined, of which the following is a specification, reference being had therein to the accompanying drawings.

This invention consists, as will be hereinafter described and claimed, of a combination-tool consisting of a tongs adapted for the use of gas-fitters, plumbers, machinists, and others, and a wrench for general use.

In the drawings, Figure 1 represents a side elevation of the upper part of the tool adapted for use as a tongs. Fig. 2 is a sectional elevation of the tool, showing its adaptation for use as a wrench.

A represents the frame or rigid member of the tool, which, in lieu of being formed, by hand, of wrought metal, is, according to my improvements, molded or cast in malleable metal, and the hollow portions or openings within which the movable members of the tool are held and operate are cored out instead of being formed by hand, by which means these tools can be very economically produced.

The upper hook-shaped end, B, of the part A is formed with a straight plain face, C, on its under side, which is utilized when the tool is used as a wrench, as will be hereinafter described, and a curved or other suitably-shaped rear and upper portion, D, against which the pipe is held when the tool is used as a tongs.

The horizontally-extending portion E of the frame A is centrally and vertically cored at $a$, to receive a sliding toothed bar, to be presently described, and is recessed at $b$ to receive the lever or arm F, which is pivoted at G within said horizontal extension E, as clearly shown at Fig. 2 of the drawings, and is provided at its upper end with a semicircular row of teeth, $c$.

H represents the slide or bar for clamping or holding the pipe or other article to be gripped. This bar is provided on one edge with a rack or row of teeth, $d$, and is passed within the central slot or opening, $a$, and held therein by a spring, $e$, which is secured at one end within a recess, $f$, in the arm A, the free end of said spring engaging with the rear or plain edge of the bar H and pressing said bar forward, so that its teeth $d$ engage with the teeth $c$ of the lever F. By this construction and arrangement whenever the lower end of the lever is raised upward the upper end will be correspondingly forced down, and as said upper end passes downward the teeth $c$ will mesh with the teeth $d$ on the bar H and draw said bar H down. Correspondingly, as the lower end of said lever F is lowered, the teeth $c$ therein will engage the teeth $d$ on the bar H and propel said bar H upward. One end, I, of this sliding bar H is provided with a serrated or roughened surface, $g$, and by placing the bar H within the frame A, in the position shown in Fig. 1, the tool is in readiness for use as a tongs, while the reverse end, J, of the bar H is provided with a plane face, corresponding in shape to that of the face C of the hook B, in order that on said bar H being placed within the opening $a$, in position the reverse of that shown in Fig. 1, the tool is in readiness for employment as a wrench, as shown in Fig. 2.

When it is desired to place the bar H in position within the frame A, the lever or handle F is raised upward until it assumes a horizontal or nearly horizontal position. The end of the bar H which it is desired shall be uppermost is then inserted within the lower end of the orifice $a$, and the rear or plane-faced edge of said bar is pressed back against the frame A, which act will compress the spring $e$ and force it within the recess $f$, thereby allowing of the unobstructed passage along said opening $a$ of the bar, which, when the spring is so compressed, can be readily slid upward into the position desired, the space between the rear wall of the part A and the teeth on the lever F being sufficient to allow of the easy passage of the bar H. Then when the pressure of the bar H against the frame A is released, the free end of the spring $e$ will spring out and force the bar forward until the teeth thereon mesh with the teeth on the lever F, when farther movement of said bar H, except by the operation of the lever F, is prevented. Similarly, whenever it is desired to reverse the position of the bar H within the frame, the lever is raised to a horizontal position, the bar H pressed rearwardly against the frame A and spring $e$, and then drawn downward and out of the opening $a$, then turned end for end and inserted in the manner above described.

The distance above the top of the opening $a$ of the frame A to which the sliding bar H shall project at the extent of its movement by the lever F is capable of easy regulation, depending upon the distance it is pushed upward before the spring is released; or such regulation can be effected at any time, after the insertion of the bar, by simply raising the lever and pressing the bar against the spring.

It will be seen that the sliding bar is thus readily adjustable to adapt the tool for holding pipes, pieces of metal, and other articles of various sizes. The tool is especially adapted for use in the putting together and taking apart of machinery, holding metal in the process of drilling, &c., for holding pipes and metals firmly without crushing or defacing them. It is more powerful in operation than gas-pliers, and will do the work required where the ordinary pliers fail, and by means of the toothed bar and toothed lever its action is instantaneous.

Having thus described my invention, what I claim is—

The combination, with the frame A, having hook B, central vertical core, $a$, recesses $b$ and $f$, and horizontal extension E, spring $e$, secured at one end within the recess $f$, lever F, pivoted at G within the horizontal extension E, and having a semicircular row of teeth, $c$, at its upper end, and the separable and reversible bar H, having on one edge a row of teeth, $d$, its end I having a corrugated or roughened surface, $g$, and its other end having a plane face, of a shape corresponding with the shape of the inner face of the hook B, substantially as and for the purpose set forth.

In testimony whereof I affix my signature in presence of two witnesses.

ELBRIDGE F. BARNES.

Witnesses:
CHARLES A. OAKS,
M. P. DWYER.